United States Patent
Su et al.

(10) Patent No.: US 7,136,955 B2
(45) Date of Patent: Nov. 14, 2006

(54) EXPANSION ADAPTER SUPPORTING BOTH PCI AND AGP DEVICE FUNCTIONS

(75) Inventors: Chun-Yuan Su, Taipei (TW); Jiin Lai, Taipei (TW); Chau-Chad Tsai, Taipei (TW); Chi-Che Tsai, Taipei (TW)

(73) Assignee: Via Technologies, Inc., Shindian (TW)

( * ) Notice: Subject to any disclaimer, the term of this patent is extended or adjusted under 35 U.S.C. 154(b) by 231 days.

(21) Appl. No.: 10/980,624

(22) Filed: Nov. 3, 2004

(65) Prior Publication Data
US 2005/0097254 A1 May 5, 2005

(30) Foreign Application Priority Data
Nov. 3, 2003 (TW) ............... 92130624 A

(51) Int. Cl.
G06F 13/00 (2006.01)
G06F 13/20 (2006.01)
G06F 13/36 (2006.01)

(52) U.S. Cl. ............ 710/313; 710/300; 710/314; 710/35

(58) Field of Classification Search .......... 710/300, 710/313, 314, 315
See application file for complete search history.

(56) References Cited

U.S. PATENT DOCUMENTS

| | | | |
|---|---|---|---|
| 5,857,086 A | 1/1999 | Horan et al. | |
| 5,859,989 A * | 1/1999 | Olarig et al. | 710/306 |
| 5,889,970 A | 3/1999 | Horan et al. | |
| 5,892,964 A | 4/1999 | Horan et al. | |
| 6,070,207 A | 5/2000 | Bell | |
| 6,523,082 B1 | 2/2003 | Yoshida | |
| 6,670,958 B1 | 12/2003 | Aleksic et al. | |
| 6,675,248 B1 * | 1/2004 | Olarig et al. | 710/305 |
| 6,678,780 B1 * | 1/2004 | Caruk et al. | 710/306 |
| 6,763,416 B1 * | 7/2004 | LaBerge | 710/305 |
| 6,789,154 B1 | 9/2004 | Lee et al. | |
| 7,024,503 B1 * | 4/2006 | Peng | 710/105 |
| 7,054,984 B1 | 5/2006 | Chang | |
| 2003/0126337 A1 * | 7/2003 | Ferguson et al. | 710/305 |
| 2003/0131178 A1 * | 7/2003 | Huang et al. | 710/315 |
| 2005/0120154 A1 * | 6/2005 | Ho et al. | 710/260 |

* cited by examiner

Primary Examiner—Rehana Perveen
Assistant Examiner—Jeremy S. Cerullo

(57) ABSTRACT

An expansion adapter is used to communicate both PCI and AGP devices to the north bridge chip of a computer. The expansion adapter includes a first AGP bus control module communicable with the north bridge chip via a first AGP bus, and a second AGP bus control module in communication with the first AGP bus control module, communicable with an AGP device via a second AGP bus. The identifying codes of the first and second AGP bus control modules are set to show no AGP device function in order to allow the AGP device to communicate with the north bridge chip via the expansion adapter. The expansion adapter further includes a PCI bus control module in communication with the PCI device and the first AGP bus control module for controlling data transmission between the first AGP bus control module and the PCI device.

19 Claims, 5 Drawing Sheets

EXPANSION ADAPTER SUPPORTING BOTH PCI AND AGP DEVICE FUNCTIONS

FIELD OF THE INVENTION

The present invention relates to an expansion adapter, and more particularly to an expansion adapter supporting both PCI and AGP device functions in a computer.

BACKGROUND OF THE INVENTION

In the current computer architecture as shown in FIG. 1, a chipset 11 is used to control data flows among a central processing unit (CPU) 10, a system memory 13 and a plurality of I/O devices including AGP (Accelerated Graphics Port) and PCI (Peripheral Component Interconnect) devices. The AGP device, for example a graphics accelerator, is electrically connected to the chipset 11 via an AGP slot 14 and an AGP bus 141. The PCI device is electrically connected to the chipset 11 via a PCI slot 12 and a PCI bus 121.

In general, the data transmission rate via an AGP bus is required to at least double the data transmission rate via a common PCI bus in order to assure of high-speed data transmission between the graphics card and the chipset. In the cases that the high-speed graphing functions are not required at all, e.g. for a server or an industrial computer, however, the exclusive AGP transmission mode becomes a redundant design. In order to make use of the devices, an adapter chip 15, in lieu of the AGP slot 14, is coupled to the north bridge chip 110 of the chipset 11 via the AGP bus 141, as shown in FIG. 2. Via the adapter chip 15, a plurality of PCI buses, e.g. two PCI buses 150 and 151 in FIG. 2, can be provided in addition to the PCI slot 12 and the PCI bus 121 the south bridge chip 111 to communicate two PCI devices 171 and 172 with the north bridge chip 110. The adapter chip 15, for example, can be a VPX chipset commercially available from VIA Technologies, Inc. (Taiwan).

Once the AGP device function is completely removed as mentioned above, there would be problems when the high-speed graphing functions are occasionally required.

SUMMARY OF THE INVENTION

Therefore, the present invention provides an expansion adapter capable of supporting both AGP and PCI device functions.

A first aspect of the present invention relates to an expansion adapter for communicating a chipset of a computer with at lease one peripheral device. The expansion adapter comprises a first AGP bus control module communicable with the chipset via a first AGP bus for controlling data transmission between the expansion adapter and the chipset, and having first identifying codes to be read and identified by the operating system of the computer, the first identifying codes being set to show no AGP device function in a first situation; and a second AGP bus control module in communication with the first AGP bus control module, communicable with an AGP device via a second AGP bus for controlling data transmission between the expansion adapter and the AGP device, and having second identifying codes to be read and identified by the operation system of the computer, the second identifying codes being set to show no AGP device function in the first situation. Accordingly, the AGP device can successfully communicate with the chipset via the expansion adapter.

Preferably, the expansion adapter further comprises a PCI bus control module in communication with the first AGP bus control module. The PCI bus control module can communicate with the PCI device via a PCI bus for controlling data transmission between the expansion adapter and the PCI device.

In an embodiment, the first AGP bus control module is coupled to the north bridge chip of the chipset via the first AGP bus.

In an embodiment, the second AGP bus control module is coupled to a graphics accelerator in the first situation.

In an embodiment, the first identifying codes and the second identifying codes include respective select bits, and each of the select bits points to a null bit in the first situation and points to an index "D0" indicating an AGP device function in a second situation.

In an embodiment, the first and second AGP bus control modules comprise respective multiplexers receiving the select bits from select pins thereof to selectively output the null bit or an identifying code of the index "D0".

In an embodiment, the select bits are undefined bits "5D[3]" of the first and second identifying codes, which are written as "0" in the first situation and written as "1" in the second situation.

In an embodiment, the data transmission through the second AGP bus and the PCI bus is controlled in a time-dividing and multiplexing manner.

In an embodiment, the expansion adapter is a chip mounted on a main board of the computer as well as the chipset.

A second aspect of the present invention relates to an expansion adapter for communicating a chipset of a computer with an AGP (Accelerated Graphics Port) device and a PCI (Peripheral Component Interconnect) device. The expansion adapter comprises a first AGP bus control module in communication with the chipset for controlling data transmission between the first AGP bus control module and the chipset; a second AGP bus control module in communication with the AGP device and the first AGP bus control module for controlling data transmission between the first AGP bus control module and the AGP device; and a PCI bus control module in communication with the PCI device and the first AGP bus control module for controlling data transmission between the first AGP bus control module and the PCI device. Each of the first and second AGP bus control modules has identifying codes to be read and identified by the operation system of the computer, and the identifying codes show no AGP device function in front of the operating system.

In an embodiment, none of the identifying codes points to an index "D0" when the identifying codes of the index "D0" indicate an AGP device function.

A third aspect of the present invention relates to a peripheral architecture of a computer, which comprises a chipset comprising a north bridge chip and a south bridge chip; an AGP (Accelerated Graphics Port) device; first and second PCI (Peripheral Component Interconnect) devices; a PCI interface coupled to the south bridge chip for communicating the first PCI device with the south bridge chip therevia; and an expansion adapter coupled to the north bridge chip via an AGP bus for communicating the AGP device and the second PCI device with the north bridge chip therevia, wherein the AGP device and the second PCI device share data transmission bandwidth between the expansion adapter and the north bridge chip in a time-dividing and multiplexing manner.

In an embodiment, the PCI interface includes a PCI slot for receiving the PCI device and a PCI bus coupling the PCI slot to the south bridge chip.

In an embodiment, the expansion adapter comprises a first AGP bus control module in communication with the north bridge chip via a first AGP bus for controlling data transmission between the first AGP bus control module and the north bridge chip, being identified as a first non-AGP device by the operating system of the computer according to first identifying codes thereof; a second AGP bus control module in communication with the AGP device via a second AGP bus and the first AGP bus control module for controlling data transmission between the first AGP bus control module and the AGP device, being identified as a second non-AGP device by the operating system of the computer according to second identifying codes thereof; and a PCI bus control module in communication with the PCI device via a PCI bus and the first AGP bus control module for controlling data transmission between the first AGP bus control module and the PCI device.

In an embodiment, each of the first and second AGP bus control modules comprises a multiplexer selectively outputting one of a null bit and an identifying code of an index "D0" indicating an AGP device function in response to a select bit inputted from a select pin of the multiplexer. The select bit is an undefined bit "5D[3]" of the first or second identifying codes, and the select bit is written as "0" to have the null bit outputted by the multiplexer when the AGP device is coupled to the expansion adapter.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
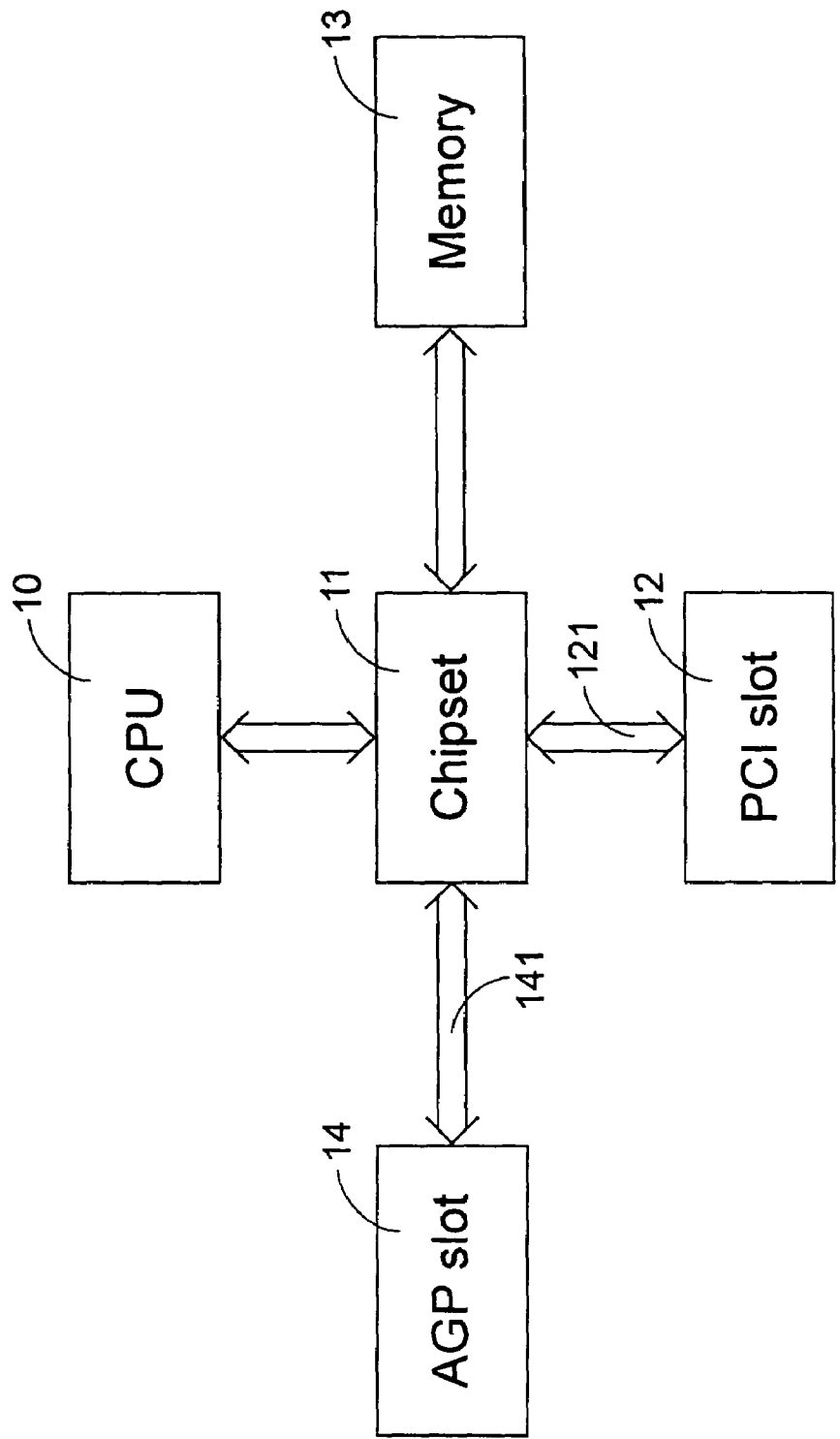
FIG. 1 is a functional block diagram illustrating a conventional peripheral interface configuration in a computer.
Figure 2:
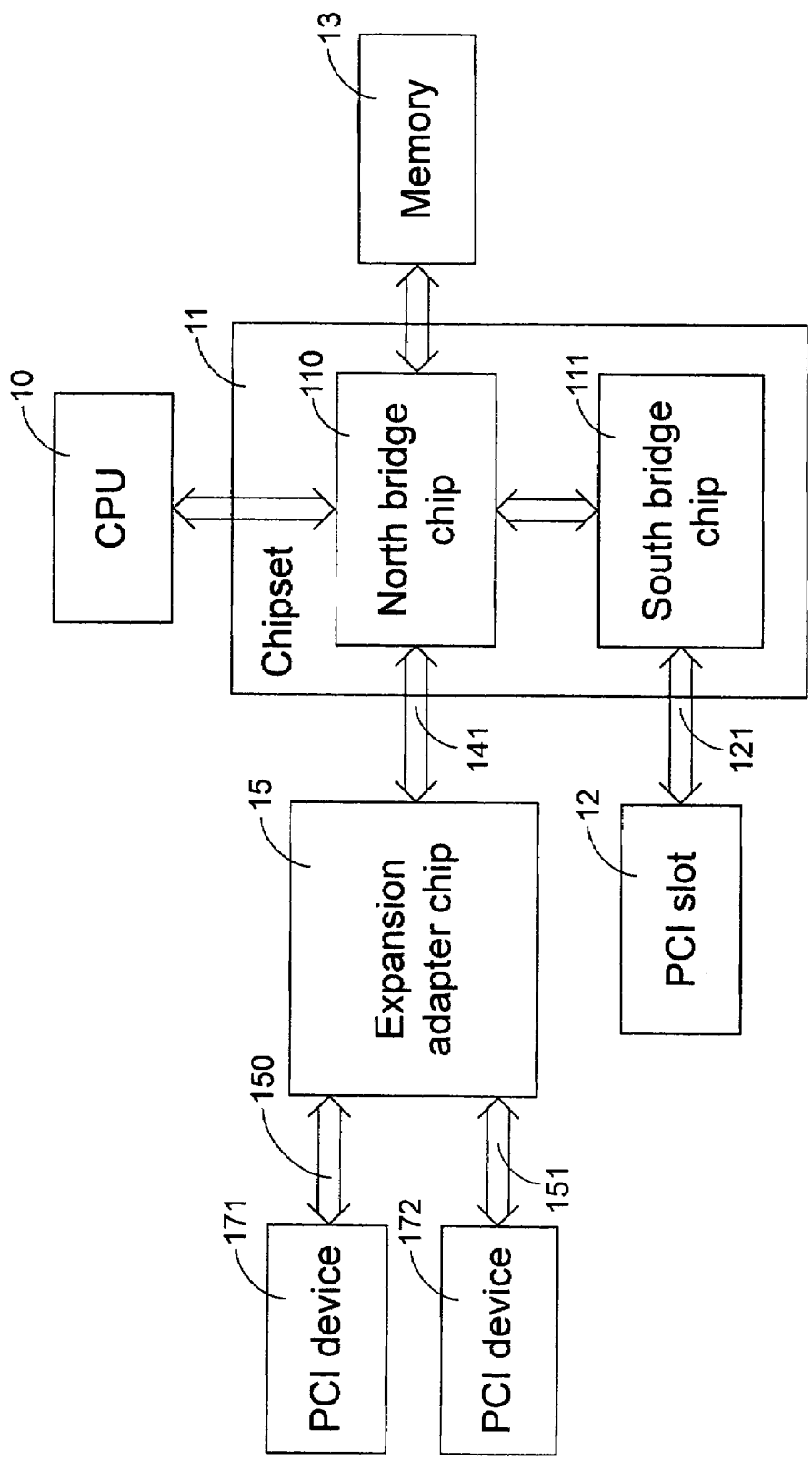
FIG. 2 is a functional block diagram illustrating another conventional peripheral architecture in a computer.
Figure 3A:
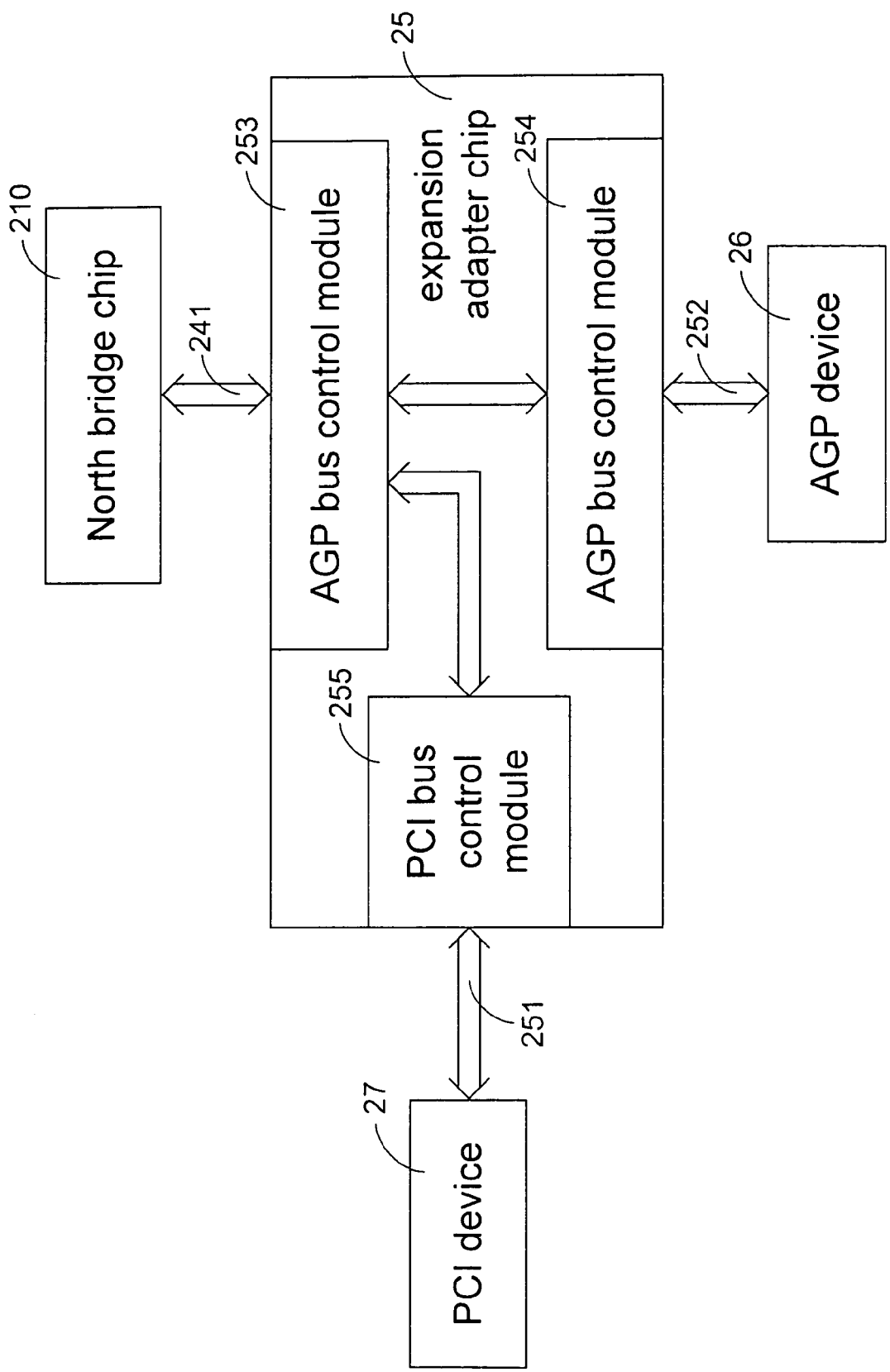
FIG. 3A is a functional block diagram illustrating an expansion adapter chip according to the present invention supporting both AGP and PCI device functions.
Figure 3B:
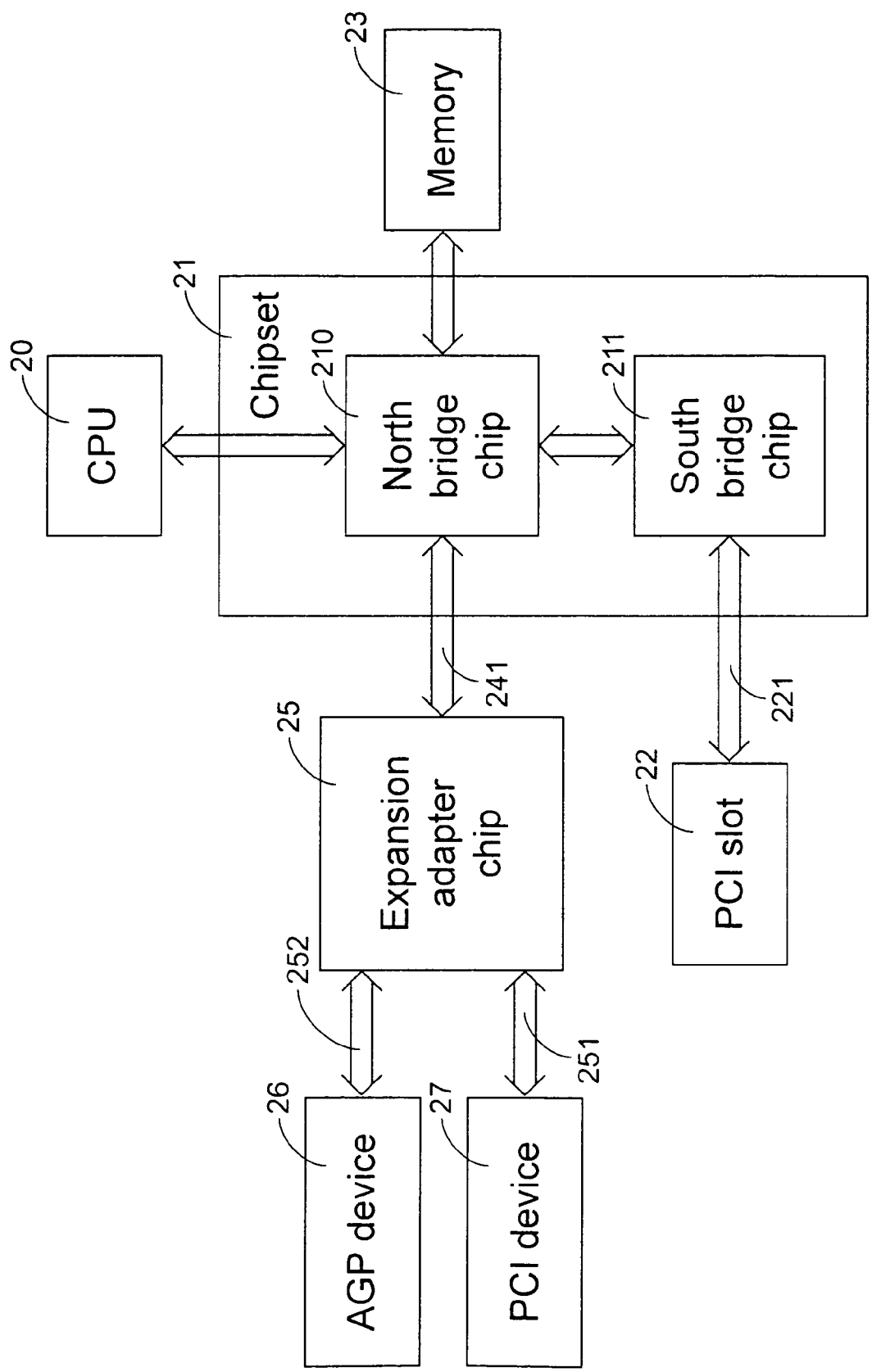
FIG. 3B is a functional block diagram illustrating the peripheral architecture including the expansion adapter chip of FIG. 3A.

For achieving the purpose of supporting both AGP and PCI device functions, as shown in FIG. 3B, the expansion adapter 25 according to the present invention comprises an AGP bus control module 253 coupled to the north bridge chip 210 via the AGP bus 241, another AGP bus control module 254 coupled to the AGP bus control module 253 and a PCI bus control module 255 coupled to the AGP bus control module 253, as shown in FIG. 3A. Via the adapter chip 25 and a PCI bus 251, a PCI device 27 can communicate with the north bridge chip 210. On the other hand, via the adapter chip 25 and an AGP bus 252, an AGP device 26 can communicate with the north bridge chip 210. Further, in the peripheral architecture of FIG. 3B, another PCI device (not shown) can be inserted to the PCI slot 22 to communicate with the south bridge chip 211 via the PCI bus 221.

As is understood, an AGP device can be considered as one of the PCI devices and in a normal state, only one AGP transmission pair is allowed to be present in the entire PCI configuration. Generally, the AGP transmission pair directs to the north bridge chip and a 3D graphics accelerator. Since two AGP transmission pairs are read by the operating system in the architecture of FIG. 3A, the disposition of the AGP bus control modules 253 and 254 between the north bridge chip 210 and the AGP device 26 might result in confusion of the system. In order to solve this problem, the AGP bus control modules 253 and 254 according to the present invention are "hidden" from the inspection of the operating system in a manner described as follows.

Figure 4:
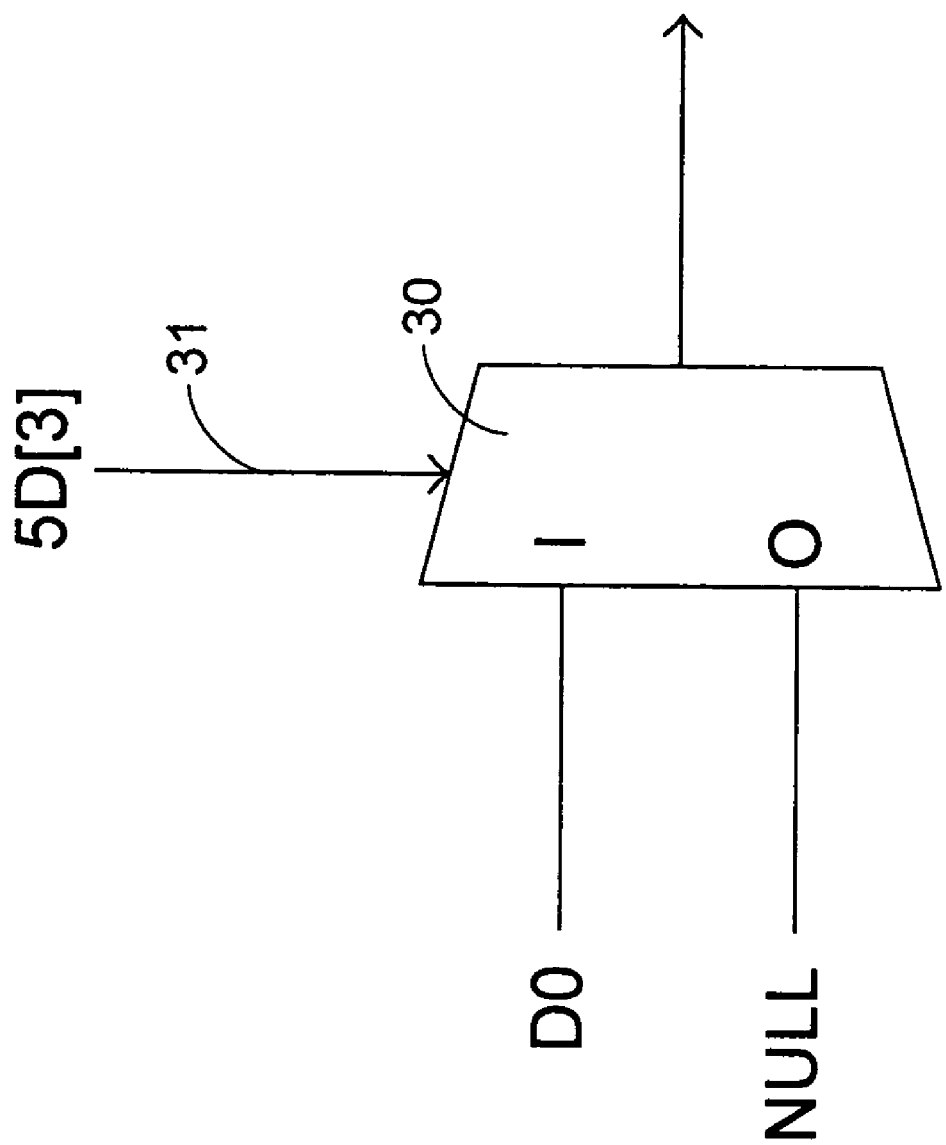
FIG. 4 is a schematic diagram showing the means for selecting or hiding the AGP device function according to an embodiment of the present invention.

According to the protocol of the PCI configuration, a set of device identifying codes, also referred to as a PCI header, is defined for each corresponding PCI device. The PCI header includes indices "00" to "FF" for mapping to various information associated with the corresponding PCI device. For example, the identifying code of the index "34" corresponds to a read-only capability pointer. Following the reading of the index "34", a series of pointing operations are conducted to realize a variety of functional information of the PCI device. For an AGP device, one of the pointing operations will locate the identifying code of the index "D0" where the AGP device function is described in a read-only manner. Accordingly, by rewriting the identifying codes of the AGP bus control modules 253 and 254 to skip the index "D0", the AGP bus control modules 253 and 254 will not be identified to exhibit AGP device functions. In an embodiment, a multiplexer 30 as shown in FIG. 4 is provided in each of the AGP bus control modules 253 and 254 as an implement to achieve this purpose.

First of all, an unidentified bit in the identifying codes associated with the AGP control modules 253 and 254, e.g. the bit "5D[3]", is set to be readable and writable so that the manufacturers or users can selectively fill the high level bit "1" or the low level bit "0" into "5D[3]". The symbol "5D[3]" means the third bit of the identifying code under the index "5D". By linking the bit "5D[3]" to the select pin 31 of the multiplexer 30 and filling the low level bit "0" into "5D[3]", a null bit rather than the index "D0" will be outputted by the multiplexer 30. Accordingly, the AGP bus control modules will show no AGP device functions in front of the operating system of the computer and will be considered as a non-AGP device. In this way, only one AGP transmission pair directing to the AGP device 26 and the north bridge chip 210 will be read by the operating system as practically expected. Of course, if the high level bit "1" is entered, it will be the identifying code of the index "D0" outputted by the multiplexer 30 so as to exhibit the AGP function of the corresponding AGP bus control module 253 or 254.

In general, the data transmission rate of an AGP device is defined as 1x, 2x, 4x, 8x, and etc. Depending on the data transmission rates respectively supported by the AGP device 26, the AGP control modules 253 and 254 of the adapter chip 25 and the north bridge chip 210, the overall data transmission rate of the system can be varied. Preferably, the system is operated under the maximal data transmission rate common to all these devices. In the embodiment shown in FIGS. 3A and 3B, since the AGP control modules 253 and 254 have been intentionally hidden from the inspection of the operating system, the AGP device 26 and the AGP bus 241 in the north bridge chip 210 are considered as the only AGP transmission pair by the operating system. Thus, the AGP device 26 and the AGP bus 241 are operated at the same data transmission rate. Meanwhile, the PCI device 27 coupled to the expansion adapter chip 25 via the PCI bus 251 and the AGP device 26 coupled to the adapter chip 25 via the AGP bus 252 share the data transmission bandwidth by controlling the data transmission through the AGP bus 252 and the PCI bus 251 in a time-dividing and multiplexing manner. In this way, the operating system can work normally without modifying the original identifying codes to be read by the operating system on the condition that the AGP device 26 and the PCI device 27 alternately dominate the transmission bandwidth of the AGP control module 253, and the AGP control module 253 is operated at the same transmission rate as the north bridge chip 210. For example, both of the real transmission rate between the AGP device 26 and the AGP control module 254 and the real transmission rate between the north bridge chip 210 and the AGP bus control module 253 are set to be identically 4×. Then, the PCI device 27 coupled to the data channel consisting of the PCI bus 251 and a PCI control module 255 shares the data transmission bandwidth of the channel between the north bridge chip 210 and the AGP control module 253 when the AGP device 26 is not transmitting data.

It is understood from the above description that the use of an expansion adapter according to the present invention is capable of supporting both PCI and AGP device functions so as to expand the application of the computer system.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An expansion adapter for communicating a chipset of a computer with at lease one peripheral device, comprising:
   a first AGP bus control module communicable with the chipset via a first AGP bus for controlling data transmission between said expansion adapter and said chipset, and having first identifying codes to be read and identified by the operating system of said computer, said first identifying codes being set to show no AGP device function in a first situation; and
   a second AGP bus control module in communication with said first AGP bus control module, communicable with an AGP device via a second AGP bus for controlling data transmission between said expansion adapter and said AGP device, and having second identifying codes to be read and identified by the operation system of said computer, said second identifying codes being set to show no AGP device function in said first situation, thereby allowing said AGP device to communicate with said chipset via said expansion adapter.

2. The expansion adapter according to claim 1 further comprising a PCI bus control module in communication with said first AGP bus control module, said PCI bus control module being communicable with a PCI device via a PCI bus for controlling data transmission between said expansion adapter and said PCI device.

3. The expansion adapter according to claim 1 wherein said first AGP bus control module is coupled to the north bridge chip of said chipset via said first AGP bus.

4. The expansion adapter according to claim 1 wherein said second AGP bus control module is coupled to a graphics accelerator in said first situation.

5. The expansion adapter according to claim 1 wherein said first identifying codes and said second identifying codes include respective select bits, each of said select bits pointing to a null bit in said first situation and pointing to an index "D0" indicating an AGP device function in a second situation.

6. The expansion adapter according to claim 5 wherein said first and second AGP bus control modules comprise respective multiplexers receiving said select bits from select pins thereof to selectively output said null bit or an identifying code of said index "D0".

7. The expansion adapter according to claim 5 wherein said select bits are undefined bits "5D[3]" of said first and second identifying codes, which are written as "0" in said first situation and written as "1" in said second situation.

8. The expansion adapter according to claim 2 wherein data transmission through said second AGP bus and said PCI bus is controlled in a time-dividing and multiplexing manner.

9. The expansion adapter according to claim 1 being a chip mounted on a main board of said computer as well as said chipset.

10. An expansion adapter for communicating a chipset of a computer with an AGP (Accelerated Graphics Port) device and a PCI (Peripheral Component Interconnect) device, comprising:
    a first AGP bus control module in communication with said chipset for controlling data transmission between said first AGP bus control module and said chipset;
    a second AGP bus control module in communication with said AGP device and said first AGP bus control module for controlling data transmission between said first AGP bus control module and said AGP device; and
    a PCI bus control module in communication with said PCI device and said first AGP bus control module for controlling data transmission between said first AGP bus control module and said PCI device,
    wherein each of said first and second AGP bus control modules has identifying codes to be read and identified by the operation system of said computer, and said identifying codes show no AGP device function in front of said operating system.

11. The expansion adapter according to claim 10 wherein said chipset is a north bridge chip.

12. The expansion adapter according to claim 10 wherein said AGP device is a graphics accelerator.

13. The expansion adapter according to claim 10 wherein none of said identifying codes points to an index "D0" indicating an AGP device function.

14. The expansion adapter according to claim 10 wherein said AGP device and said PCI device share the data transmission bandwidth in a time-dividing and multiplexing manner.

15. A peripheral architecture of a computer, comprising:
    a chipset comprising a north bridge chip and a south bridge chip;
    an AGP (Accelerated Graphics Port) device;
    first and second PCI (Peripheral Compontent Interconnect) devices;
    a PCI interface coupled to said south bridge chip for communicating said first PCI device with said south bridge chip therevia; and
    an expansion adapter coupled to said north bridge chip via an AGP bus for communicating said AGP device and said second PCI device with said north bridge chip therevia, wherein said AGP device and said second PCI device share data transmission bandwidth between said expansion adapter and said north bridge chip in a time-dividing and multiplexing manner, wherein said expansion adapter comprises:

a first AGP bus control module in communication with said north bridge chip via a first AGP bus for controlling data transmission between said first AGP bus control module and said north bridge chip, being identified as a first non-AGP device by the operating system of said computer according to first identifying codes thereof;

a second AGP bus control module in communication with said AGP device via a second AGP bus and said first AGP bus control module for controlling data transmission between said first AGP bus control module and said AGP device, being identified as a second non-AGP device by the operating system of said computer according to second identifying codes thereof; and a PCI bus control module in communication with said PCI device via a PCI bus and said first AGP bus control module for controlling data transmission between said first AGP bus control module and said PCI device.

16. The peripheral architecture according to claim 15 wherein said expansion adapter is a chip mounted on a main board of said computer along with said chipset.

17. The peripheral architecture according to claim 15 wherein said PCI interface includes a PCI slot for receiving said PCI device and a PCI bus coupling said PCI slot to said south bridge chip.

18. The peripheral architecture according to claim 15 wherein each of said first and second AGP bus control modules comprises a multiplexers selectively outputting one of a null bit and an identifying code of an index "D0" indicating an AGP device function in response to a select bit inputted from a select pin of said multiplexer.

19. The peripheral architecture according to claim 18 wherein said select bit is an undefined bit "5D[3]" of said first or second identifying codes, and said select bit is written as "0" to have said null bit outputted by said multiplexer when said AGP device is coupled to said expansion adapter.

* * * * *